Dec. 15, 1964  C. J. SANDFORT  3,161,313
COMBINATION COLLAR, LID AND HANDLE FOR BABY FOOD JARS
Filed Oct. 30, 1963

CHRISTIAN J. SANDFORT
INVENTOR

3,161,313
COMBINATION COLLAR, LID AND HANDLE FOR BABY FOOD JARS
Christian J. Sandfort, 2353 Dorma Ave., Louisville 17, Ky.
Filed Oct. 30, 1963, Ser. No. 320,017
11 Claims. (Cl. 215—64)

The invention herein described pertains to a novel apparatus for gripping and removing small jars from boiling water and assisting in subsequent storage.

The general method of heating small jars of foodstuffs, more specifically prepared baby foods, is to remove the top of the jar to avoid pressure build-up and explosion, then place the jar into a pan of cold water and bring to boil. After a length of time satisfactory to the person responsible for feeding the infant the jars containing warm feed are removed.

The means for removing the jars from hot water are: first, the fingers, which will, unless the person is extremely dexterous, be burned, and second, various tongs and scissors like items. The latter units are rarely suitable for objects with the small amount of gripping surface as a baby food jar.

The replaceable lids normally supplied as the sanitary seal and lid of the jar are put aside during the heating process described above. A small infant will consume only a portion of the jar of food. The cap is then replaced if still available, or clean enough, and the jar placed in refrigerated storage until the contents are finally consumed. If several brands or types i.e.; fruit, meat or vegetables are used at a meal the lids are not interchangeable from brand to brand or type to type within a brand. Time is consumed trying to determine which lid fits which jar.

Another difficulty is that while the water is boiling, the glue holding the label in place is driven into solution in the boiling water. If there is a sufficient high water level and a violent boiling action this dilute glue solution will contaminate the food.

I have invented a novel apparatus for removing the jar from the boiling water bath, protecting the contents from contamination during heating and providing a reclosure during temporary storage.

This collar and its integral lid and handle would normally be made of a plastic material with stability to resist boiling water, ability to hold and release from jar protuberances during many cycles and have dimensional stability. However, it is still within the intent of the invention that either the whole or any parts or components may be made from materials such as metal, treated paper, plastics, etc.

This apparatus is an integral unit composed functionally of a jar gripping collar which is designed to fit a variety of jar sizes, a lid attached to the jar gripipng collar and several lock-down tabs to assure the closing of the lid, first to the jar gripping collar and secondly over the top of the jar.

These, and other objects and advantages of this invention will hereinafter appear for purposes of illustration, but not of limitation.

Figure 1:
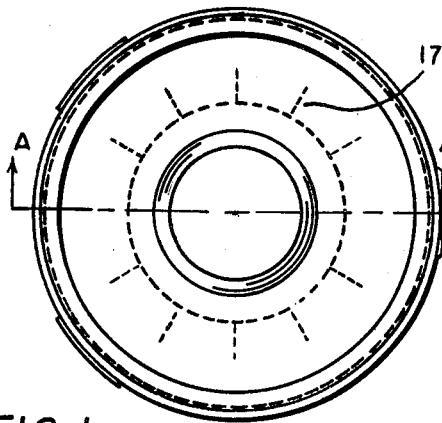
FIG. 1 is a top view and FIG. 1a is a side elevational view of the collar, lid and handle shown attached to the exterior of the neck part of a jar.
Figure 2:
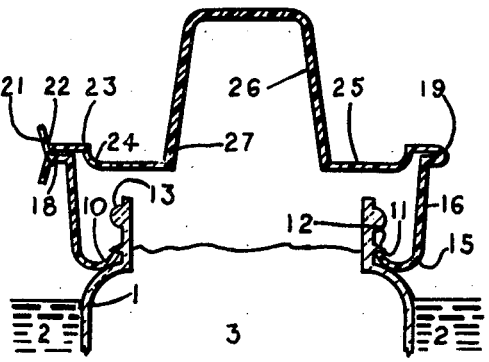
FIG. 2 is a sectional view of the jar removal part in FIGURE 1 sectioned at A, A.
Figure 1A:
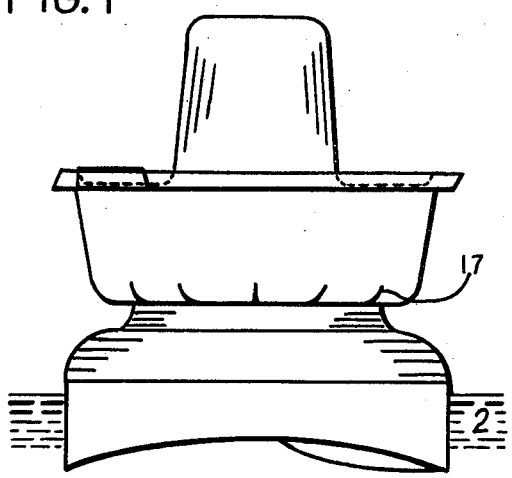

The concepts of this invention reside in a unit shown in FIGURES 1 and 2 which is composed of truncated upwardly and inwardly progressing conical pilot portion 10 which terminates in the clamping surface 11. This inwardly-upwardly progressing surface performs the clamping operation on a multiplicity or jar external diameters, by locking onto chime 12, or in some instances, the threaded portion of the jar 13. This truncated conical surface 10 intersects with another truncated conical surface 16 in a curved manner 15. Accommodation for deformation to conform to a range of neck diameters and removal of the part from the jar is promoted by equally spaced slits 17 through the curled undersection 15 through the inwardly-upwardly progressing truncated conical surface 10. The external truncated cone 16 extends upwardly to a horizontal flange 18 which extends peripherally around and is projected from the conical section 16. This surface provides a base for hinge 19 and an extension from the flange 18 forms lock tabs 21.

Figure 3:
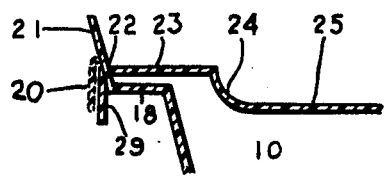
FIG. 3 is a fragmentary enlarged sectional view of the tab locking method shown in FIGURE 2.

These lock tabs are shown in FIGURE 3 in detail in closed or locking position 20 and in open position 21. The lock action of the tab is created by forcing the tab 21 through slit 22 and pushing manually through an arc of 180° to closed position 20.

The sealing top 25 closes the collar body 10 and hence the jar 1 by horizontal top flange 23 mating with horizontal peripheral flange 18. A vertical wall 24 extends downwardly to fit inside the interior of truncated cone 10.

Extending from the point of intersection of vertical lid flange 24, inwardly from the horizontal flange is the protective membrane 25. With these parts alone temporary clamp-down and lidding are accomplished.

Further embodied in the invention and of major importance is the truncated cone 26 formed from or attached to the membrane 25 at a circle of intersection 27. This cone provides for a cooler, protected gripping surface than either flange 18 or truncated conical section 10. It is protected from the boiling water 2 by vertical lid flange 29.

Figure 4:
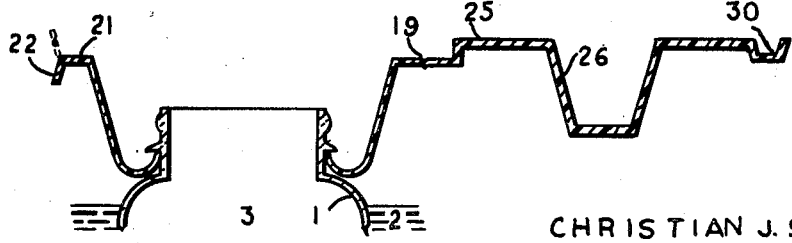
FIG. 4 shows schematically the top-most section in the open feeding position.

An important concept of this invention, shown schematically in FIG. 4, resides in the construction which permits the top 25 with its integral conical handle 26 to be folded at hinge 19 to open jar 1 and expose the contents 3. By turning hold down tab 21 connected to horizontal flange 18 upwardly and sliding tab 21 through slot 30 then folding the top at hinge 19 to any convenient position the contents 3 are exposed.

Figure 5:
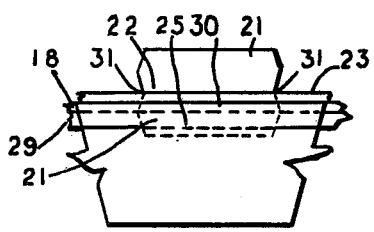
FIG. 5 shows detail of the lock tab function.

A front view of a segment of the collar and lid showing the positive locking method is illustrated by FIGURE 5 wherein the segment of a cylinder 21 extending perpendicularly upward and attached to the horizontal peripheral flange 18 is notched 31 and forced through a matching curvalinear slot 30 in the horizontal top flange 23. Cylindrical segment tab 21 is then forced by finger pressure through a 180° bend. The cylindrical segment 21 then assumes a position perpendicularly but downward to the horizontal peripheral flange 18. The stress thus placed at the hinging section 22 due to its cylindrical nature keeps the top downwardly projecting vertical flange 29 from being moved upward to the open position.

It will be apparent from the foregoing description that I have provided a unit which enables a user to secure purchase on a heated jar whether before, during, or after heating; to remove it from the heating medium when properly constructed of a material or materials of a heat insulating nature.

It will be apparent from the description that I have provided a means of reclosure of the jar as an integral part of the gripping collar not completely separable therefrom and it will be understood that other geometric shapes than the multiplicity of integral cones would be suitable as long as the gripping is done as shown and the reclosure features are the same and are in keeping with the spirit of this invention.

I claim:

1. A collar and integral lid formed of a heat resistant material which, starting at the internal gripping surface, is a section of downwardly and outwardly progressing truncated cone, the minor diameter of the cone being essentially that of the neck of the jar, with the major diameter of the cone being essentially that of the body of the jar to be held forming a pilot surface, and margin which intersects at a circle tangential to the surface of the bottom of a segment of a torus progressing downwardly and outwardly then upwardly and outwardly intersecting tangentially another truncated cone progressing upwardly and outwardly from the surface of intersection terminating at a line of intersection with a continuous ledge portion extending outwardly from line of intersection, this portion being interconnected at any appropriate point with an integral hinge interconnected to a vertical upwardly progressing cylindrical section terminated at a line caused by the intersection of a plane generated by an arc of substantially similar radial dimensions as the continuous ledge, terminating at the intersection of the plane and a perpendicularly downward progressing inner cylinder which terminates at line of intersection formed by the inner cylinder and a perpendicular plane from which is formed a truncated conical section with a major diameter less than the inner cylinder but greater than the minor radius of the cone, the minor conical section ending at a line created by the intersection of the upwardly inwardly progressing conical wall and a disk defined by the minor diameter of the cone.

2. A collar as in claim 1 for use in conjunction with jars for obtaining a grip on the neck for temporary reclosure of the jar and storage.

3. A collar and lid as in claim 1 with suitable tab or tabs projecting outwardly and upwardly from the continuous collar flange to intersect with a matching slotted void in the upper part of the major circumference of the lid outer cylinder and cut with opposing slits to make the slotted portion of the lid equal to the material remaining between the slits in the tabs.

4. A collar as in claim 1 wherein the gripping action between the jar neck and the pilot surface of the inner truncated cone of singular construction is made to conform to a range of distortions due to differing neck diameters on the jar and between different sizes of jars by the natural elasticity of the material of manufacture.

5. A collar as in claim 1 wherein the gripping action between the jar neck and the gripping surface at the beginning of the pilot surface of the inner truncated cone of singular construction is made to conform to a range of distortions due to differing neck diameters on the jars and between different sizes of jars by equidistantly spaced flutes or pleats around the inner cone extending from the toroidal segment upward and inward to the gripping surface or inner boundary of the collar.

6. A collar as in claim 1 wherein the gripping action between the jar neck and the pilot surface of the inner truncated cone of singular construction is made to conform to a range or distortions due to differing neck diameters of the jars and between different sizes of jars by equidistantly spaced cuts or voids around the inner cone extending from the toroidal segment upward and inward to the gripping surface, or inner boundary of the collar.

7. A collar as in claim 3 made of polypropylene, polyvinyl chloride or of other synthetic resin or mixtures thereof.

8. A collar as in claim 3 wherein the top only is made of metal.

9. A collar and top assembly as in claim 1 wherein the metal is aluminum or steel.

10. A top as in claim 1 wherein the top only is metal.

11. Collar and top in claim 1 wherein the two parts, both collar and top, are permanently joining with no provision for removal of the lid portion without removing the whole parts.

No references cited.

FRANKLIN T. GARRETT, *Primary Examiner.*